(12) United States Patent  
Wilson et al.

(10) Patent No.: US 7,733,644 B2  
(45) Date of Patent: Jun. 8, 2010

(54) NOTEBOOK COMPUTER WITH TILTING KEYBOARD VENT

(76) Inventors: Robyn L. Wilson, 1205 Terrace Mill Dr., Murphy, TX (US) 75094; Kelce S. Wilson, 1205 Terrace Mill Dr., Murphy, TX (US) 75094

( * ) Notice: Subject to any disclaimer, the term of this patent is extended or adjusted under 35 U.S.C. 154(b) by 247 days.

(21) Appl. No.: 12/114,808

(22) Filed: May 4, 2008

(65) Prior Publication Data

US 2009/0273893 A1    Nov. 5, 2009

(51) Int. Cl.
*H05K 7/20* (2006.01)
(52) U.S. Cl. .................... 361/679.49; 361/679.12; 361/694; 361/695
(58) Field of Classification Search ............. 361/679.12
See application file for complete search history.

(56) References Cited

U.S. PATENT DOCUMENTS

| | | | |
|---|---|---|---|
| 5,539,615 A | | 7/1996 | Sellers |
| 5,694,294 A * | | 12/1997 | Ohashi et al. .......... 361/679.48 |
| 5,764,474 A | | 6/1998 | Youens |
| 5,818,360 A * | | 10/1998 | Chu et al. .............. 341/22 |
| 6,028,768 A * | | 2/2000 | Cipolla ................ 361/679.12 |
| 6,078,495 A * | | 6/2000 | Cipolla et al. ........ 361/679.46 |
| 6,144,554 A * | | 11/2000 | Mok ................ 361/679.08 |
| 6,175,492 B1 * | | 1/2001 | Nobuchi .............. 361/679.08 |
| 6,239,971 B1 | | 5/2001 | Yu |
| 6,430,042 B1 * | | 8/2002 | Ohashi et al. ......... 361/679.49 |
| 6,459,573 B1 * | | 10/2002 | DiStefano et al. ..... 361/679.46 |
| 6,762,931 B2 | | 7/2004 | Chen |
| 6,853,543 B1 * | | 2/2005 | Moore et al. .......... 361/679.12 |

* cited by examiner

*Primary Examiner*—Gregory D Thompson
(74) *Attorney, Agent, or Firm*—Kelce S. Wilson

(57) ABSTRACT

A notebook computer with a tilting keyboard, which opens a vent when tilted, solves multiple problems and may further materially contribute to countering terrorism. A tilted position of the keyboard allows the vent to open when the notebook lid is open, thereby providing extra cooling capacity during periods of computer use when there is a lessened need for compactness. The vent is it least partially closed when the keyboard is in the stowed position and the lid is closed, thereby reducing the possibility of debris ingestion when air flow needs are reduced and the need for compactness is increased. A security inspection position of the keyboard enables inspection of the inside of the computer, for example as part of a security checkpoint procedure. A negative tilt can reduce wrist strain and repetitive motion injuries for some users. Some embodiments tilt the keyboard automatically in response to the lid opening, and stow the keyboard automatically in response to the lid being closed.

20 Claims, 6 Drawing Sheets

NOTEBOOK COMPUTER WITH TILTING KEYBOARD VENT

TECHNICAL FIELD

The invention relates generally to electrical systems and devices comprising housing or mounting arrangements with keyboards, and more specifically to electrical systems and devices wherein at least one electronic device has key input means combined with housing or mounting arrangements.

BACKGROUND

Computer keyboard usage is well-known to be a cause of repetitive strain injury, and notebook computers are notorious for inferior ergonomic design, due to attempts to reduce size and weight. Some patents attempt to address these issues, including U.S. Pat. No. 5,539,615 to Sellers ("Sellers"); U.S. Pat. No. 5,764,474 to Youens ("Youens"); and U.S. Pat. No. 6,762,931 to Chen ("Chen"), which disclose tilting keyboards and are incorporated by reference as teachings of prior art. Unfortunately, the paradigm for these solutions is modeled after desktop keyboards, which tilt in a positive direction, i.e., the portion of the keyboard furthest from the user is higher than the portion of the keyboard closest to the user. This arrangement requires the user to bend his or her wrists backward, which fatigues muscles in the top of the forearm and hand, leading to discomfort, and sometimes, injury. This harmful design is a legacy of mechanical typewriters, and is perpetuated primarily by user familiarity.

Another issue with notebook computers is their propensity to overheat, and in some situations, actually ignite fires. This results primarily from space-saving measures by manufacturers attempting to produce compact devices. Unfortunately, such designs place heat generating components in confined spaces, without adequate airflow. Vents are typically small, restricting the flow rate. Larger vents, which could ease overheating problems, are typically not used, due to their vulnerability to moisture and debris, and their demands on valuable surface area. These problems are severe enough to create a need for aftermarket cooling accessories, such as the notebook computer cooling rack disclosed in U.S. Pat. No. 6,239,971 to Yu et al. ("Yu"), which is incorporated by reference as a teaching of prior art. However, these external cooling devices must be carried and powered, placing additional burdens on the user when the notebook computer is used in a mobile fashion, such as when riding on an airplane, a train, or a motorcycle.

BRIEF SUMMARY

A tilting keyboard for a notebook computer, which opens an air duct aperture when tilted, simultaneously solves multiple problems with current notebook computer design. Embodiments with a negative tilt can reduce wrist strain. A tilted orientation of the keyboard provides an opening for heated exhaust air and/or cool intake air. Movement of the keyboard allows the air duct aperture to be open to the when the display is in an open position, thereby providing extra cooling capacity during periods of computer operation, but then at least partially closes the air duct aperture when the display is moved to the closed position, thereby reducing the possibility of moisture and debris ingestion when air flow needs are reduced. Some embodiments tilt the keyboard automatically in response to the lid opening, and stow the keyboard automatically in response to the lid being closed.

A primary consideration for notebook computers is compactness. However, this concern is more pronounced during periods of transport in a bag than during periods of use. Another primary consideration for notebook computers is adequate airflow capacity for cooling. However, this concern is more pronounced during periods of use than during periods of transport in a bag. Thus, the most acute needs for compactness and airflow capacity are generally not coincident in time. When the need for one is greater, the need for the other is reduced. Therefore, embodiments of the invention alternate trade-offs between compactness and airflow capacity. Embodiments allow for compactness with reduced airflow capacity in a first configuration of the notebook computer and a reduction in compactness with an increase in airflow capacity in a second configuration.

Another consideration for notebook computers is their potential security implications, since they are heavy enough and enclose enough volume to carry weapons, explosives, wireless communication devices, and portable electric power. A security inspection position of the keyboard, for example a hyper-extended tilt, enables inspection of the inside of the notebook computer for dangerous materials, for example as part of a security checkpoint procedure at an airport. Therefore, embodiments of the invention will materially contribute to countering terrorism.

The foregoing has outlined rather broadly the features and technical advantages in order that the description that follows may be better understood. Additional features and advantages will be described which form the subject of the claims. It should be appreciated by those skilled in the art that the conception and specific embodiments disclosed may be readily utilized as a basis for modifying or designing other structures for carrying out the same purposes. It should also be realized by those skilled in the art that such equivalent constructions do not depart from the spirit and scope of the invention as set forth in the claims. The novel features which are believed to be characteristic of the invention will be better understood from the following description when considered in connection with the accompanying figures. It is to be expressly understood, however, that each of the figures is provided for the purpose of illustration and description only and is not intended as a definition of the limits of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
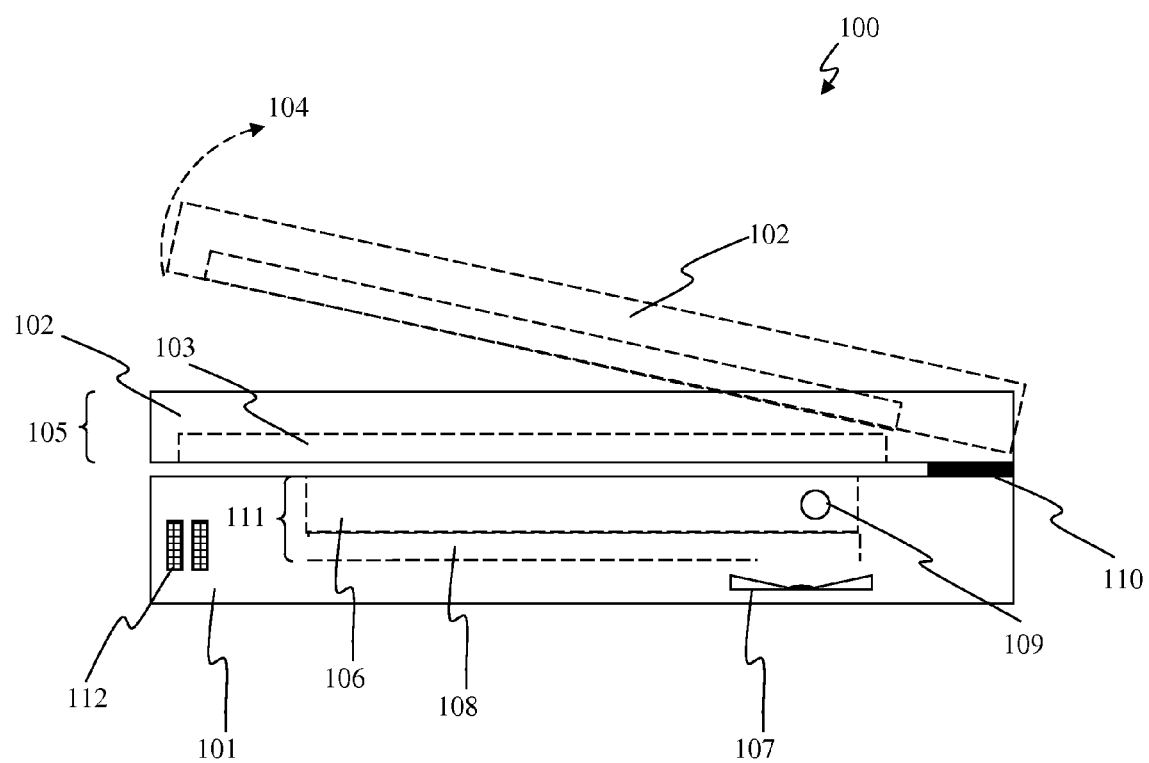
FIG. 1 illustrates a side view of an embodiment of a notebook computer comprising a tilting keyboard.

FIG. 1 illustrates a side view of an embodiment of a notebook computer 100 comprising a tilting keyboard structure 106. Notebook computer 100 comprises a base 101 and a lid 102, which comprises a display 103. Lid 102 is illustrated in open position 104 using dashed lines and in closed position 105 using solid lines. Lid 102 may be positioned in either manner. Closed position 105 is illustrated as lid 102 lying adjacent to base 101, and in some embodiments, lid 102 may be latched to prevent accidental opening. Open position 104 is illustrated as a range of possible angles for lid, in excess of some minimum angle, and in some embodiments, lid 102 may form an obtuse angle with base 101 when in open position 104. Lid 102 is pivotably attached to base 101 through a hinge 110, although it should be understood that other attaching members may be used.

Notebook computer 100 further comprises a keyboard structure 106 attached to base 101. Keyboard structure 106 may comprise a QWERTY keyboard and any supporting structure necessary to provide a sufficiently solid support for typing. As illustrated, keyboard structure 106 is pivotably attached to base 101 through a hinge 109, although it should be understood that other attaching members may be used. Keyboard structure 106 is configured to be positioned in a stowed position 111 as illustrated, and also a tilted position, illustrated in FIG. 2. In some embodiments, the tilted position results in a positive tilt relative to base 101, similar to a typewriter keyboard. In some embodiments, the tilted position results in a negative tilt relative to base 101, so that a user's hands are angled downward when using the keyboard structure 106. In some embodiments, keyboard structure 106 has multiple tilt angles, based on a user's preferred tilt configuration. In some embodiments, keyboard structure 106 may be positioned into both a positive tilt position and a negative tilt position.

In the illustrated embodiment, keyboard structure 106 is in the stowed position 111 to enable lid 102 to close. In order for keyboard structure 106 to move to a tilted position, lid 102 is moved to the open position, thereby providing clearance for keyboard structure 106 to tilt. A cooling fan 107 is disposed to create an airflow directed to cool base 101, including computing components with base 101. An air duct 108 is configured to direct the airflow and is illustrated as within keyboard structure 106 so that it pivots along with keyboard structure 106. In some embodiments, air duct 108 is positioned differently, such as adjacent to keyboard structure 106. Air duct 108 may comprise an intake duct for cool air and/or an exhaust duct for heated air. Screened vents 112 in base 101 provide for additional airflow, for example intake air if air duct 108 is an exhaust duct, and exhaust air, if air duct 108 is an intake duct.

Figure 2:
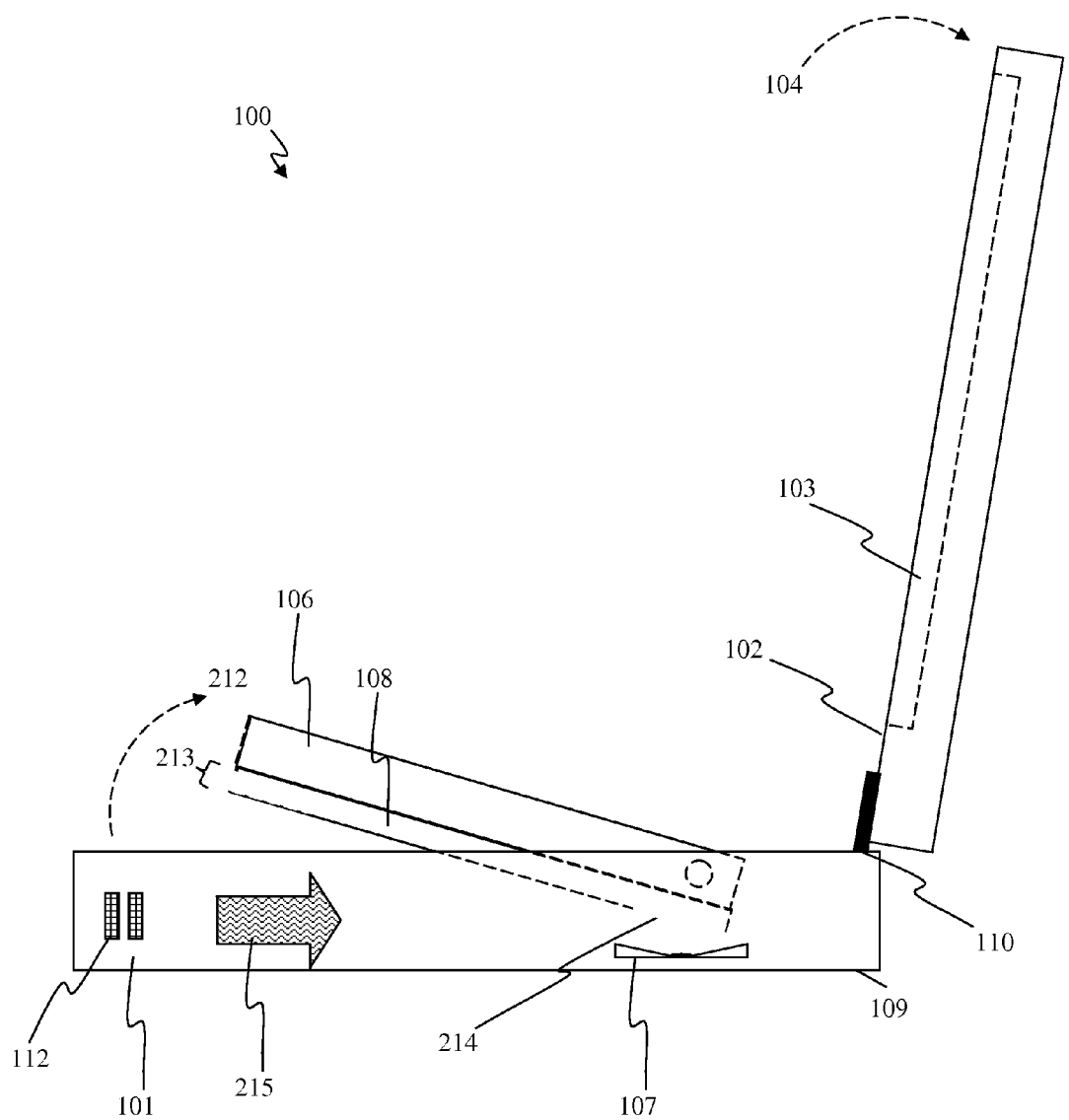
FIG. 2 illustrates another side view of an embodiment of a notebook computer comprising a tilting keyboard.

FIG. 2 illustrates another side view of notebook computer 100, with lid 102 in open position 104 and keyboard structure 106 in negatively tilted position 212. With keyboard structure thus positioned, an aperture 213 is opened to permit a higher rate of airflow through duct 108, forced by fan 107, than when keyboard structure 106 is in stowed position 111, as illustrated in FIG. 1. Moving keyboard structure 106 to stowed position 111 will at least partially close off aperture 213, thereby reducing the airflow capacity of duct 108 and permitting a lesser rate of the airflow than when the keyboard structure is in tilted position 212, as illustrated in FIG. 2. Moving keyboard structure 106 to tilted position 212 from stowed position 111 will increase the airflow capacity of duct 108. As illustrated, keyboard structure 106 is disposed between aperture 213 and lid 102. Aperture 213 may be either an inlet port or an exhaust port. Duct 108 is coupled to fan 107 via aperture 214, so that an airflow 215, driven by fan 107 is directed through base 101 and forced through aperture 214 into duct 108, and out of aperture 213. Although in the illustrated embodiment, screened vents 112 act as intake ports, and aperture 213 acts as an exhaust port, the direction of airflow 215 may be different in some embodiments.

Figure 3:
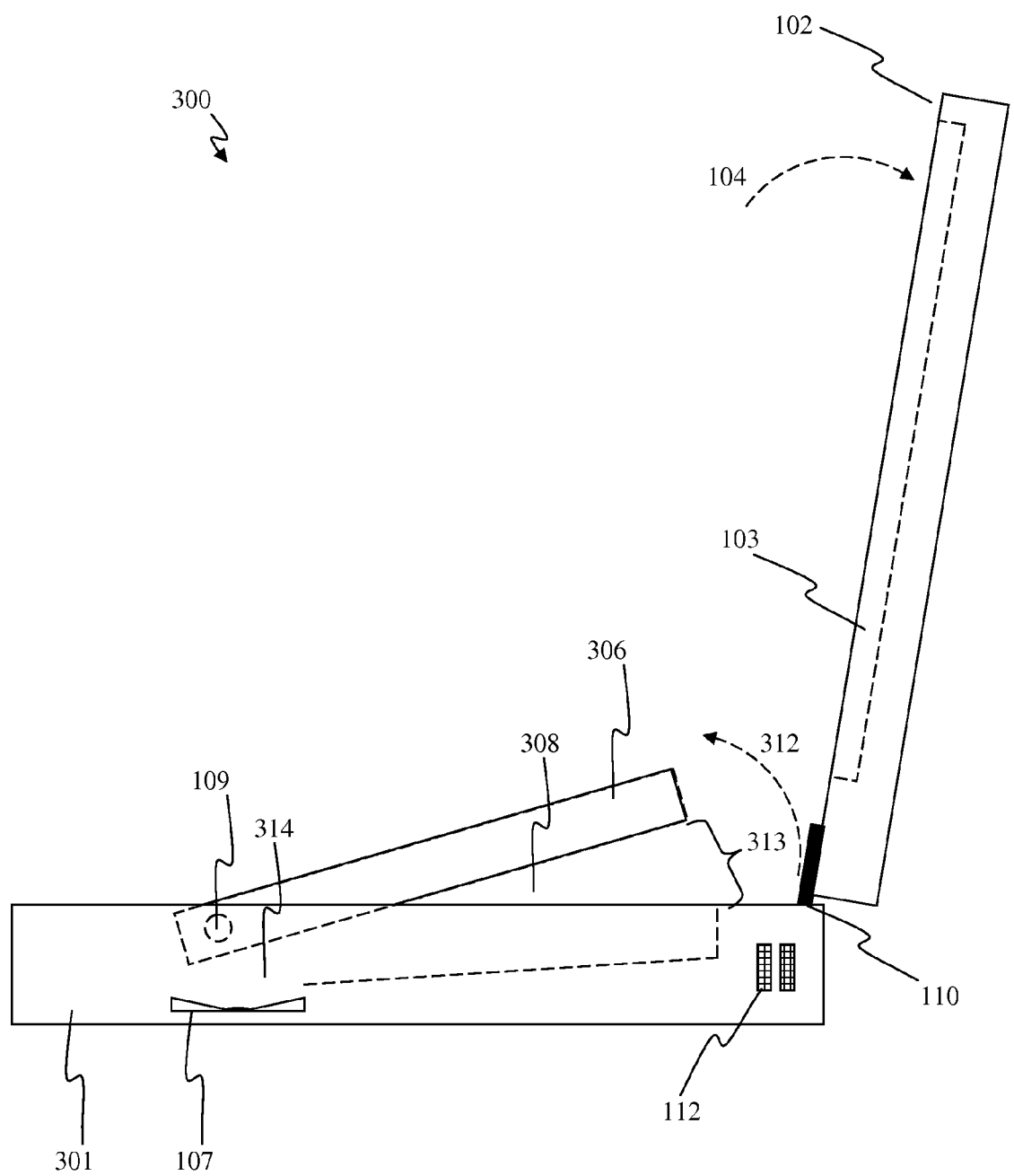
FIG. 3 illustrates another side view of an embodiment of a notebook computer comprising a tilting keyboard.

FIG. 3 illustrates a side view of a notebook computer 300 comprising a base 301, with lid 102 in open position 104 and a keyboard structure 306 in a positively tilted position 312. With keyboard structure thus positioned, an aperture 313 is opened to permit a higher rate of airflow through an air duct 308, forced by fan 307, than when keyboard structure 306 is in a stowed position, similar to stowed position 111 for keyboard structure 106, as illustrated in FIG. 1. Moving keyboard structure 306 to a stowed position will at least partially close off aperture 313, thereby reducing the airflow capacity of duct 308 and permitting a lesser rate of the airflow than when the keyboard structure is in tilted position 312, as illustrated in FIG. 3. As illustrated, aperture 313 is disposed closer to lid 102 than is keyboard structure 306, and duct 308 is adjacent to keyboard structure 306. Aperture 313 may be either an inlet port or an exhaust port. Aperture 314 couples fan 107 to duct 308. In some embodiments, the aperture coupling a fan to a duct may be shrouded, in order to more tightly constrain the directed airflow. Fan 107 may be an axial fan, a squirrel cage fan, or another type of air movement system.

Figure 4:
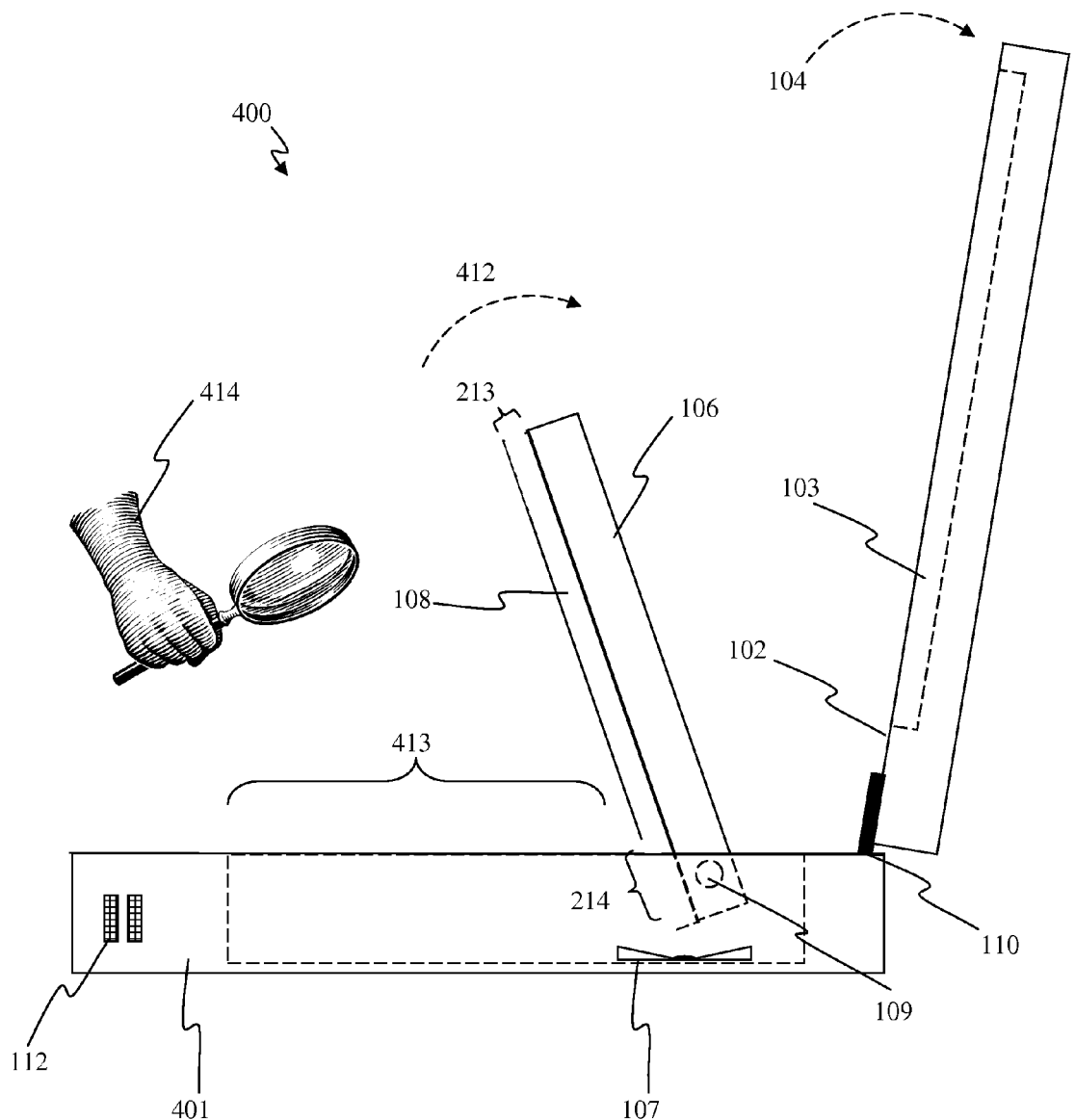
FIG. 4 illustrates another side view of an embodiment of a notebook computer comprising a tilting keyboard.

FIG. 4 illustrates a side view of a notebook computer 400 with tilting keyboard structure 106 in a security inspection position 412. Security inspection position 412 permits a security inspector 414, for example an inspector at an airport security checkpoint, to exam the interior of a base 401 of notebook computer 400 through an inspection aperture 413. In some embodiments, security inspection position 412 is a hyper-extended tilt in comparison to tilted position 212. In comparing the illustrated embodiments in FIGS. 1 and 4, security inspection position 412 enables easy viewing of the inside of base 401, whereas tilted position 212 is more aligned with a comfortable typing position. In some embodiments aperture 413 provides an access opening for swipe pads, which can test for chemical residues in the interior of notebook computer 400. It should be understood that a security inspection position and/or an inspection aperture can also be used with keyboard structures that tilt in the opposite direction, such as versions of notebook computer 300 illustrated in FIG. 3.

By permitting an inspection of the interior of base 401, it is easier for security inspector 414 to ascertain that notebook computer 400 does not contain any materials associated with terrorist activities, such as explosives or other weapons. Therefore, embodiments of the invention will materially contribute to countering terrorism.

Figure 5:
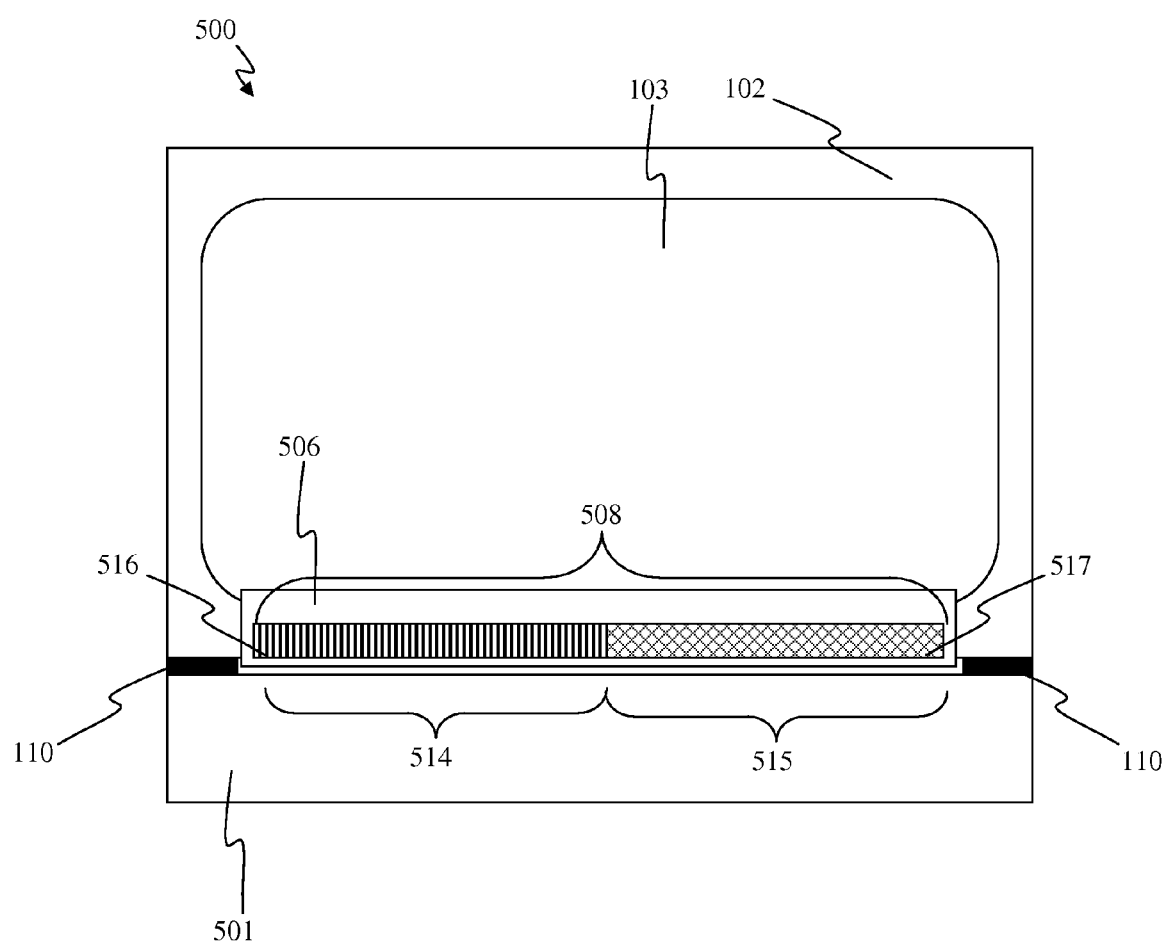
FIG. 5 illustrates a frontal view of an embodiment of a notebook computer comprising a tilting keyboard.

FIG. 5 illustrates a frontal view of a notebook computer 500 with a tilting keyboard structure 506 in tilted position 212. A dual channel air duct 508 comprises two air ducts: an exhaust duct 514 and an intake duct 515. The frontal view exposes the apertures at the open ends of ducts 514 and 515, which comprise an exhaust port and an inlet port, respectively. A louvered debris screen 516 covers at least a portion of the opening of exhaust duct 514, and is configured to change a direction of airflow, for example by directing it at an angle toward the side of notebook computer 500, so that a warm breeze is not aimed directly at the computer user. An air filter 517, disposed within the path of the cooling intake airflow, protects intake duct 515 from ingesting dust, moisture and other debris that might otherwise accumulate inside base 101. In some embodiments, air filter 517 is removable for cleaning and/or replacement. In some embodiments, air filter 517 is electrostatic. In some embodiments, the angle of air deflection of louvered debris screen 516 is changeable. In operation, a fan pulls air through filter 517, into intake duct 515, forces it through base 501 to provide cooling, then pushes it through duct 514 and out through debris screen 516.

Figure 6:
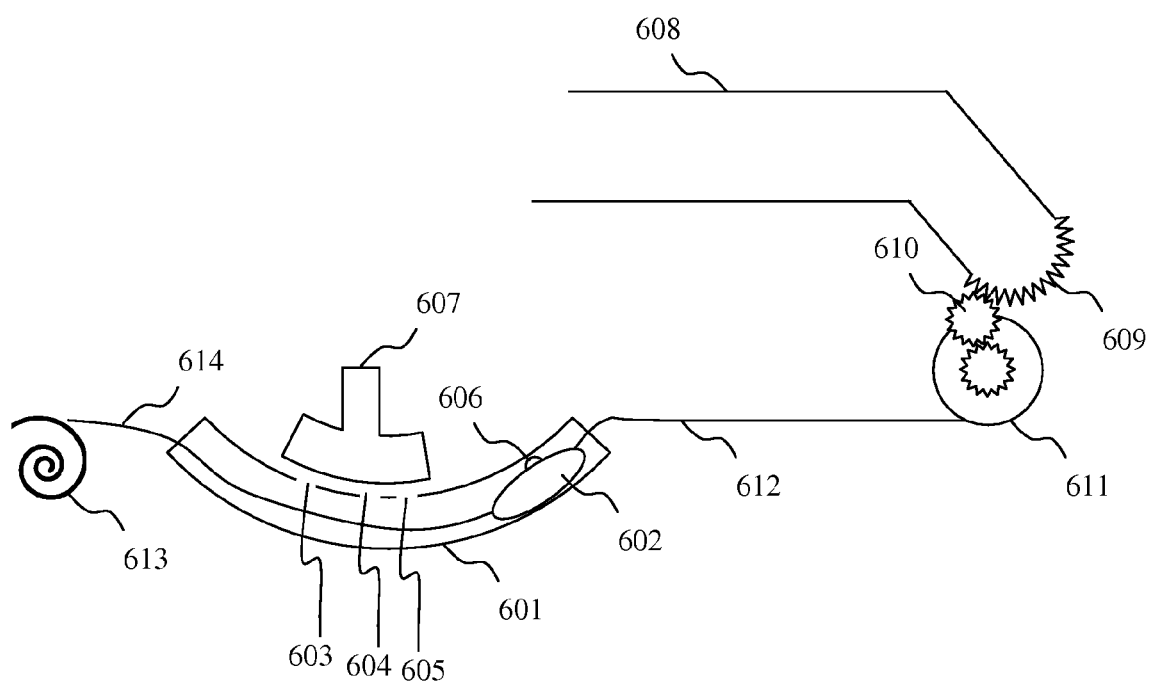
FIG. 6 illustrates actuating members for a tilting keyboard.

FIG. 6 illustrates some exemplary actuating members for a tilting keyboard structure, although it should be understood that a tilting keyboard structure can be implemented with other actuating members in addition to or instead of those illustrated. A curved track 601 is formed in a base (not illustrated here) of a notebook computer, on each side of a tilting keyboard structure (not illustrated here). An alignment member 602 protrudes from each side of the keyboard structure to engage the curved track. As illustrated, if viewed from the right-hand side of a notebook computer base, curved track 601 and alignment member 602 enable a keyboard structure to tilt negatively for typing, and also to tilt to a security inspection position. When alignment member 602 is in right portion of curved track 601, the keyboard structure will be in the stowed position. As alignment member 602 moves leftward, within curved track 601, the keyboard structure will tilt with the left-most side, as viewed from the perspective of FIG. 6, rising. When alignment member 602 reaches the left portion of curved track 601, the keyboard structure will be in the most tilted configuration, which is the security inspection position.

Three tilt alignment holes 603, 604 and 604 are illustrated, which provide for a plurality of possible tilted typing positions. It should be understood that a lesser or greater quantity may be used. A tilt lock pin 606, for example a spring-loaded pin, is disposed in alignment member 602, and engages one of alignment holes 603, 604 and 604 as alignment member 602 moves leftward. When lock pin 606 engages one of alignment holes 603, 604 and 604, alignment member 602 will be locked into position, thus fixing the tilt angle of the keyboard structure. A pin plunger 607 is shaped and positioned above alignment holes, 603, 604 and 604, so that depressing pin plunger 607 will release lock pin 606 from whichever one of alignment holes 603, 604 and 604 it had engaged. Releasing lock pin 606 enables alignment member 602 to continue traversing curved track 601 to the stowed position, the security inspection position, or another tilted typing position. In this manner, the keyboard may be locked at an adjustable angle.

When a lid 608 is opened, a toothed section 609 turns a gear 610, which then turns a geared spool 611, thus slackening a stowing cable 612. Since stowing cable 612 is attached to alignment member 602, this motion enables alignment member 602 to move leftward along curved track 601. When lid 608 is moved from an open position to the illustrated closed position, toothed section 609 again turns gear 610, which then turns geared spool 611, reeling in stowing cable 612. This motion pulls alignment member 602 rightward along curved track 601 to the stowed position. Any of toothed section 609, gear 610, geared spool 611, and stowing cable 612 may be considered to be a stowing member.

When stowing cable 612 slackens, a biasing member 613, for example a spiral coil spring, pulls a tilting cable 614, which is attached to alignment member 602. This motion pulls alignment member 602 leftward along curved track 601. In this manner, biasing member 613 biases the keyboard structure to a tilted position when lid 608 is moved from the closed position into the open position. It should be understood that alternative biasing members and arrangements may be used.

A method of cooling a notebook computer comprises: opening a lid of the notebook computer attached to the notebook base; tilting a keyboard structure relative to the base, thereby increasing an airflow capacity of a cooling duct; and forcing airflow through the duct, which is directed to cool at least some of the components within the base. The method may further comprise filtering the airflow, blocking debris from entering the duct, and/or changing a direction of the airflow with at least one louver acting as a baffle. Tilting the keyboard structure may comprise negatively tilting the keyboard structure relative to the base.

Although the invention and its advantages have been described above, it should be understood that various changes, substitutions and alterations can be made herein without departing from the spirit and scope of the claims. Moreover, the scope of the present application is not intended to be limited to the particular embodiments described in the specification. As one of ordinary skill in the art will readily appreciate from the disclosure, alternatives presently existing or later to be developed that perform substantially the same function or achieve substantially the same result as the corresponding embodiments described herein may be utilized according to the invention. Accordingly, the appended claims are intended to include within their scope such alternatives.

What is claimed is:

1. A notebook computer comprising:
   a base;
   a lid comprising a display, wherein the lid is attached to the base and is configured to be positioned in an open position and a closed position;
   a keyboard structure attached to the base, wherein the keyboard structure is configured to be positioned in a stowed position and a tilted position, and wherein the keyboard structure is positionable in the tilted position when the lid is in the open position but not when the lid is in the closed position;
   a cooling fan disposed to create an airflow directed to cool the base; and
   a first air duct configured to direct the airflow, wherein an aperture of the air duct permits a higher rate of the airflow when the keyboard structure is in the tilted position and a lesser rate of the airflow when the keyboard structure is in the stowed position.

2. The notebook computer of claim 1 further comprising:
   an air filter disposed within a path of the airflow.

3. The notebook computer of claim 1 further comprising:
   a debris screen covering at least a portion of the aperture.

4. The notebook computer of claim 1 wherein the keyboard structure is further configured to be positioned in a security inspection position permitting an examination of an interior portion of the base.

5. The notebook computer of claim 1 wherein the aperture comprises an exhaust port for the airflow.

6. The notebook computer of claim 1 wherein the aperture comprises an inlet port for the airflow.

7. The notebook computer of claim 1 further comprising:
   a second air duct, wherein the first air duct comprises an inlet duct for the airflow and the second air duct comprises an exhaust duct for the airflow.

8. The notebook computer of claim 1 wherein the keyboard structure is disposed closer to the lid than is the aperture.

9. The notebook computer of claim 1 wherein the aperture is disposed closer to the lid than is the keyboard structure.

10. The notebook computer of claim 1 further comprising:
    a keyboard structure hinge pivotably attaching the keyboard structure to the base.

11. The notebook computer of claim 1 further comprising:
    a curved track, wherein the keyboard structure is slidably attached to the base through the curved track, and wherein the stowed position and the tilted position are positions of the keyboard structure along the curved track.

12. The notebook computer of claim 1 further comprising:
   a biasing member configured to bias the keyboard structure to the tilted position when the lid is moved from the closed position into the open position.

13. The notebook computer of claim 1 further comprising:
   a keyboard structure stowing member configured to move the keyboard structure to the stowed position when the lid is moved from the open position to the closed position.

14. The notebook computer of claim 1 wherein the tilted position is a negatively tilted position relative to the base.

15. The notebook computer of claim 1 wherein the keyboard structure comprises the first air duct.

16. The notebook computer of claim 1 wherein the keyboard structure is adjacent to the aperture.

17. A method of cooling a notebook computer, the method comprising:
   opening a lid of the notebook computer attached to a base of the notebook computer;
   tilting a keyboard structure relative to the base, thereby increasing an airflow capacity of a cooling duct; and
   forcing an airflow through the duct, wherein the airflow is directed to cool the base.

18. The method of claim 17 wherein tilting a keyboard structure comprises negatively tilting the keyboard structure relative to the base.

19. The method of claim 17 further comprising:
   filtering the airflow.

20. The method of claim 17 further comprising:
   changing a direction of the airflow with at least one baffle.

* * * * *